(12) United States Patent
Holze

(10) Patent No.: US 9,203,343 B2
(45) Date of Patent: Dec. 1, 2015

(54) DEVICES FOR OPTIMIZING INDIVIDUAL SOLAR MODULES/COLLECTOR MODULES AND COMPOSITE COLLECTOR MODULE GROUPS AND STABILIZING THE OPERATION THEREOF AGAINST ENVIRONMENTAL INFLUENCES, ESPECIALLY WIND AND PARTICLES AND OBJECTS CARRIED ALONG BY THE WIND

(75) Inventor: Carsten Holze, Berlin (DE)

(73) Assignee: MACHTWISSEN.DE AG, Bremen (DE)

( * ) Notice: Subject to any disclaimer, the term of this patent is extended or adjusted under 35 U.S.C. 154(b) by 0 days.

(21) Appl. No.: 14/119,645

(22) PCT Filed: May 25, 2012

(86) PCT No.: PCT/DE2012/000572
§ 371 (c)(1),
(2), (4) Date: Feb. 20, 2014

(87) PCT Pub. No.: WO2012/159611
PCT Pub. Date: Nov. 29, 2012

(65) Prior Publication Data
US 2014/0150852 A1    Jun. 5, 2014

(30) Foreign Application Priority Data

May 26, 2011  (DE) .......................... 10 2011 103 304
Oct. 3, 2011   (DE) .......................... 10 2011 115 474

(51) Int. Cl.
*F24J 2/10*    (2006.01)
*F24J 2/46*    (2006.01)
(Continued)

(52) U.S. Cl.
CPC ............... *H02S 40/00* (2013.01); *F24J 2/4638* (2013.01); *Y02E 10/40* (2013.01)

(58) Field of Classification Search
CPC ............ F24J 2/4609; F24J 2/405; F24J 2/05; F24J 2002/5292; F24J 2002/5275; Y02B 10/20; Y02E 10/47; Y02E 10/40
USPC .................................................. 126/571, 570
See application file for complete search history.

(56) References Cited

U.S. PATENT DOCUMENTS 1,989,999 A    2/1935  Niederle
4,247,182 A *  1/1981  Smith .............................. 353/3
(Continued)

FOREIGN PATENT DOCUMENTS

DE   10 2006 050 456   4/2008
DE   10 2009 038 962   2/2011
(Continued)

OTHER PUBLICATIONS

International Search Report PCT/DE2012/000572 dated Nov. 22, 2013.

*Primary Examiner* — Gregory Huson
*Assistant Examiner* — Daniel E Namay
(74) *Attorney, Agent, or Firm* — Frommer Lawrence & Haug LLP

(57) ABSTRACT

Devices for optimizing occurring environmentally specific loads, i.e., forces and moments of reflecting and absorbing solar collectors and module groups composed thereof. The construction is a combination of the device according to the invention for optimizing individual solar collector modules and assembled groups of collector modules and corresponding modules themselves. The devices act in the entire operation area by influencing and optimizing the flow around the individual solar collector modules and assembled groups of collector modules and accordingly leads to lower static loads and dynamic loads and, therefore, to increased efficiencies.

19 Claims, 5 Drawing Sheets

(51) Int. Cl.
*H01L 31/042* (2014.01)
*F24J 2/08* (2006.01)

(56) References Cited

U.S. PATENT DOCUMENTS

| | | | | |
|---|---|---|---|---|
| 4,323,052 | A * | 4/1982 | Stark | 126/571 |
| 4,324,947 | A * | 4/1982 | Dumbeck | 136/248 |
| 4,333,314 | A * | 6/1982 | Allen | 60/675 |
| 4,346,731 | A * | 8/1982 | Sigworth, Jr. | 137/433 |
| 4,449,514 | A * | 5/1984 | Selcuk | 126/571 |
| 4,491,388 | A * | 1/1985 | Wood | 359/853 |
| 4,586,487 | A * | 5/1986 | Argoud et al. | 126/571 |
| 6,231,197 | B1 * | 5/2001 | Nakamura | 359/853 |
| 7,607,427 | B2 * | 10/2009 | Yi et al. | 126/600 |
| 7,730,676 | B2 * | 6/2010 | Hon | 52/173.3 |
| 7,735,483 | B2 * | 6/2010 | Papageorgiou | 126/571 |
| 8,122,878 | B1 * | 2/2012 | Gross et al. | 126/600 |
| 8,171,928 | B2 * | 5/2012 | Glynn | 126/571 |
| 8,210,162 | B2 * | 7/2012 | Simmers | 126/571 |
| 8,324,496 | B1 * | 12/2012 | Gross et al. | 136/246 |
| 8,418,686 | B1 * | 4/2013 | Liao | 126/571 |
| 8,499,756 | B2 * | 8/2013 | Bathurst et al. | 126/581 |
| 8,829,330 | B2 * | 9/2014 | Meyer et al. | 136/246 |
| 2003/0172922 | A1 * | 9/2003 | Haber | 126/600 |
| 2008/0040990 | A1 * | 2/2008 | Vendig et al. | 52/173.3 |
| 2009/0189040 | A1 * | 7/2009 | Fantinelli | 248/276.1 |
| 2010/0043776 | A1 * | 2/2010 | Gee | 126/571 |
| 2010/0170502 | A1 * | 7/2010 | Glynn | 126/684 |
| 2010/0275901 | A1 * | 11/2010 | Simmers | 126/571 |
| 2010/0275904 | A1 * | 11/2010 | Bathurst et al. | 126/600 |
| 2011/0023863 | A1 * | 2/2011 | Andretich | 126/570 |
| 2011/0023864 | A1 * | 2/2011 | Andretich | 126/570 |
| 2011/0036342 | A1 * | 2/2011 | Allen et al. | 126/571 |
| 2011/0048405 | A1 | 3/2011 | Koetter et al. | |
| 2011/0056486 | A1 | 3/2011 | North | |
| 2011/0186040 | A1 * | 8/2011 | Liao | 126/571 |
| 2011/0226232 | A1 | 9/2011 | Grip | |
| 2013/0022727 | A1 * | 1/2013 | Sherwin | 426/523 |
| 2013/0068302 | A1 * | 3/2013 | Muker-Uz-Zaman et al. | 136/259 |
| 2014/0150852 | A1 * | 6/2014 | Holze | 136/251 |
| 2015/0076314 | A1 * | 3/2015 | Holze | 248/560 |

FOREIGN PATENT DOCUMENTS

| | | | |
|---|---|---|---|
| EP | 2 366 965 | 9/2011 | |
| EP | 2 520 875 | 11/2012 | |
| WO | WO 2008000282 A1 * | 1/2008 | F24J 2/46 |
| WO | WO 2009/140234 | 11/2009 | |
| WO | WO 2010/109508 | 9/2010 | |

* cited by examiner

DEVICES FOR OPTIMIZING INDIVIDUAL SOLAR MODULES/COLLECTOR MODULES AND COMPOSITE COLLECTOR MODULE GROUPS AND STABILIZING THE OPERATION THEREOF AGAINST ENVIRONMENTAL INFLUENCES, ESPECIALLY WIND AND PARTICLES AND OBJECTS CARRIED ALONG BY THE WIND

The present application claims priority from PCT/DE2012/000572 filed on May 25, 2012, which claims priority from German Patent Application Nos. DE 10 2011 115 474.8 filed on Oct. 3, 2011, and DE 10 2011 103 304.5 filed on May 26, 2011, the disclosures of which are incorporated herein by reference in their entirety.

FIELD OF THE INVENTION

The present invention is directed to devices for optimizing and stabilizing in operation loads specific to the environment and reaction moments occurring at reflecting and absorbing solar collectors and module groups composed thereof. Further, the flow around or through individual collector modules or groups and arrays composed of collector modules is optimized by the devices according to the invention for protecting reflecting and absorbing solar collectors against environmentally induced stresses and, therefore, plant efficiency is optimized.

It is noted that citation or identification of any document in this application is not an admission that such document is available as prior art to the present invention.

Solar power plants generally utilize concentrating, absorbing or reflecting modules in discrete configuration, but usually in array configuration, i.e., with a plurality of individual modules grouped together. These modules convert solar radiation into electrical energy directly, e.g., through photovoltaic cells, or indirectly, e.g., through conversion of thermal energy by circular process.

Initial developments of solar-thermal applications can be seen already at the start of the previous century. The first collector modules or installations for exploiting solar radiation were developed in Africa and in the United States of America. They were used almost exclusively for generating and exploiting thermal energy. For example, U.S. Pat. No. 1,989,999 from Jun. 7, 1933 describes the basic construction of a thermal tube collector which has remained essentially unchanged in principle to the present day. What has greatly changed, however, are the structural sizes and capacity of plants in order to achieve high plant outputs by means of high radiation power in approximate correlation to the surface area of the modules in discrete configuration or array configuration. Therefore, as the scale of installations has proceeded from simple roof application to power plant applications, design has generally become oriented above all to the acting forces and moments and further influences through parts which are moved along in the flow such as for example and by means of environmental conditions.

Present-day concentrating technologies for bundling solar radiation require a high accuracy with regard to the tracking of corresponding systems to the position of the sun which can be constructed as single-axis or two-axis tracking systems depending on the power plant technology employed. Depending on their construction, the solar modules can be displaced individually or serially in parallel by one or more drives. The choice of drive components is governed by the type of installation or system and by the acting environmental influences and design criteria resulting therefrom.

Building on the tested designs in the domain of power plants, the first of which were built and tested during the first and second oil crises, i.e., in the 1970s, basic trends have crystallized around the area of thermal applications, i.e., typically in parabolic troughs, heliostats, dishes and Fresnel systems, to name the most important designs realized from the start of the twentieth century, and in photovoltaic applications, i.e., simple flat panels as well as concentrating systems.

One example of a conventional solar collector is the parabolic trough in U.S. Patent Application 2011/0048405 of Feb. 26, 2010, i.e., the design of the collector disclosed therein with steel torsion tube, steel support arms and glass mirrors. The parabolic glass mirrors which are used are held by corresponding supporting structure and track the position of the sun. The receiver is positioned in the focal line of the parabolic mirrors. All of the forces and occurring torques are transmitted through the mirrors to the support arms and from there to the torsion tube and are diverted into a suitable drive.

Application DE 10 2009 038 962 of Aug. 20, 2009 discloses a construction of a solar thermal collector which is rather unconventional, although the design is optimized against the background of a mechanical, material-specific configuration. A tubular base body with a transparent upper shell and lower shell constructed as a mirror is used in this case. The acting forces are received by the tube body and diverted to the supporting construction which is in turn outfitted with a drive for power transmission. In the operationally relevant positions, higher efficiencies can be expected in principle compared to conventional systems owing to the construction of the collector as closed tube element and due to the possibility of absorbing higher force and torques based on the mode of construction. However, they are overcompensated in part or, as the case may be, completely by the transparent cover, i.e., the front collector cover.

In principle, the efficiencies to be achieved by solar power plants increase with the accuracy of tracking or minimizing of possible angular deviations of the solar modules with respect to the position of the sun. Losses are caused in particular by systematic angular deviations and/or additional dynamic deflection. In this regard, the occurring environmental influences—in particular the prevailing wind load—play an important role for deflections from the ideal position relative to the sun. The occurring deflections can basically be divided into classes, the most important of which are as follows:

(a) the natural deformation of the absorbing and/or reflecting modules by their own weight in the entire operating angle range (by convention, the sunrise position is defined as alpha=0°) of possible tracking, i.e., from actual alpha=−30° (protected position in the east) to alpha=180° (sunset position) or sometimes even alpha=210° (safety position in the west); in principle, however, the entire rotational angle range or tracking angle range for azimuth and elevation in the respective ranges from 0° to 360° is taken into account); in case of nontracking systems, the calculated loads of a static position may also possibly be used for this purpose; to determine the design loads, the effective inherent loads can be assumed as quasi-static with known (vertical) force vector;

(b) the deformation of each individual collector module due to environment, in addition to inherent weight as described in (a); deformations or twisting of corresponding arrangements of collector modules marked substantially by wind loads but also by snow loads; these loads and the deformations resulting therefrom can occur in an unsteady manner (so as to vary temporally and spatially);

(c) additionally occurring effects of the deformation in the above-mentioned classes due to temperature differences occurring over the course of a day and over the course of a year; however, as regards systems currently in operation these effects are negligible compared to the deformations marked by the influence of wind and inherent weight.

Depending on wind velocities, the maximum deflections of the absorbing or reflecting collector module surfaces in respective angular position (tracking of the position of the sun) occurring individually or in combination with each other in the operating field under the influence of wind in accordance with the above-mentioned classes of deformation are the subject matter of the design and dimensioning of the individual collector module and, therefore, also of a module group composed thereof. In assessing the guidelines for design and configuration of the absorbing and/or reflecting collector modules with respect to anticipated extensive cumulative deflections of assembled module groups, this instance of deformation, i.e., the cumulative deformation (usually a combination of deformation and torsion), is also utilized as a dimensioning principle or design principle. In the target operating angle range, taking the maximum permissible wind velocities in regular operation as a basis, theoretically consistent maximum plant efficiency should be achievable while taking into account corresponding configuration criteria.

A further, safety-related configuration criterion for the solar energy installations, i.e., the individual absorbing and/or reflecting collector modules as well as the module groups composed thereof, consists in preventing damage to the installations over the course of years even under unfavorable environmental influences, i.e., for example, with wind velocities appreciably above operating wind velocities.

In order to withstand these environmental conditions, solar plants are usually operated in so-called safety positions which, depending on operation, are characterized by relatively lower loads and corresponding torques compared to the operating configurations. Due to the maximum possible wind velocities, the deformations and associated loads and/or moments occurring in this position may be substantially greater or higher, respectively, than would be permissible for plant operation at the highest efficiencies. However, permanent, i.e., plastic, deformations should be avoided.

Viewing the design requirements for solar energy installations against the background of minimizing possible deformations and the direct influence thereof on the efficiency of installations during operation alongside the requirements of installations in the safety position leads to the conclusion that these requirements, based on the mode of construction, stem almost exclusively from the conditions and methods for reducing deformations during regular operation. Appropriately dimensioned and designed installations likewise withstand the maximum loads and moments occurring in the so-called safety positions, but only with increased elastic deformation and/or increased use of material to reinforce the installations. In the future, optimized operation of all power plant fields which is adapted to diverse individual parameters and which is reflected in an optimized total efficiency will determine the level of so-called cost of electricity by source (cost of generating electrical energy) and will accordingly decide the success and use of corresponding technologies. This is also true for possible optimizations of overall field operation and, therefore, of the total efficiency; these tasks are also distinguished in principle from the (efficiency) optimizations of the individual collector module units and components thereof based on the diverse individual parameters. In this regard, an important role is played by the environmental influences affecting the entire power plant, the operating wind velocity and resulting loads and moments affecting the individual collectors, which should be minimal in the first optimization step described above, and the loads acting on the assembled collector module units which, in the operation field, consist of the cumulative individual loads and additional interference loads (interaction between the incident flow conditions and other installation parts). Depending on the operating conditions in effect, the interference loads occurring in the operation area can be many times greater than the cumulative load on the collector module units of the entire power plant system. Accordingly, a detailed theoretical and empirical consideration of the occurring interferences and their effect on the efficiency of the entire power plant and a correspondingly induced deformation of the individual collector modules and assembled module units will be indispensable in the future for configuration and dimensioning.

The solar power plants and reflecting and/or absorbing solar collectors and module groups composed thereof which are designed with the above-mentioned view points in mind and optimized for operation will ensure that solar radiation is converted into electric or thermal energy at the theoretically highest efficiency.

In regular power plant operation, aside from the minimal deviations and/or deformations from the optimal geometry and/or optimal alignment of the individual modules and/or module groups composed thereof with respect to the position of the sun which are required for ensuring maximum overall plant efficiencies, many other diverse individual parameters of the overall power plant must be adapted and optimized. As concerns the conversion process (circular process for converting thermal energy into electrical energy), these parameters are known from conventional power plant operation and can be transferred directly to solar energy plants by analogy and/or theories on similarity.

A simple optimization taking into account all of the parameters resulting from the arrangement and configuration of assembled solar module groups, the associated displacing units and/or tracking units and all of the components installed in the solar field will not be possible. There is a need over the long term to work this out for each individual configuration taking into account each of the individually contributing parameters relating to the mode of construction. Primary among these is the individual configuration of the individual solar collectors and of the collector module groups composed thereof in relation to wind.

Together, the optimization and adaptation of all of the individual steps of regular operation will ensure an optimal overall efficiency and provide for minimized so-called power generation costs (costs of generating electrical energy) which will decide the success and utilization of corresponding technologies in the future.

When considering modern solar power plant systems, i.e., the principles underlying the configuration and design of these systems and of the individual collector modules and module units composed thereof, it will undoubtedly be concluded that corresponding structures have been regarded thus far as construction works and, therefore, as static structures. However, upon closer consideration of their operation, it will be seen that as regards the tracking of the sun's position by the individual collector modules and the module units composed thereof, the sensitive surface in question is moved/displaced for converting solar radiation into thermal energy or directly into electrical energy. This takes place in at least one axis and, accordingly, at least over 180° with high tracking accuracy.

Depending on the mode of construction, 98% of a modern solar power plant system with respect to components whose design is affected by environmental influences consists of solar absorbing and/or reflecting modules, i.e., a sensitive surface for converting solar radiation into thermal energy or directly into electrical energy, which surface can be moved and/or displaced in power plant operation. Therefore, the configuration of these systems heretofore based on the principles of static constructions seems neither suitable nor optimal; because of the movement and/or tracking of the solar energy installations and the changes in plant geometry entailed thereby, the design principles to be applied vary within an enormous range of values. Added to this, as it relates to real plant operation rather than theoretical design, are the environmental influences affecting the entire power plant which include the operating wind velocity and resulting loads and moments on the individual modules and, more importantly, on the module units composed thereof which should be minimal—at least in theory—as a result of optimized configuration. In contrast to the theoretical approach which considers the forces and moments on the isolated modules and assembled collector module units as static, interference loads (interaction between incident flow conditions and further parts of the installation) occur in addition to the cumulative individual loads in regular plant operation. Static interference loads and, depending on the mode of construction, also dynamic interference loads can be many times greater than the cumulative loading of the collector module units of the total power plant system assumed in theory, depending on the dominant operating conditions and associated environmental parameters in the operation area.

Accordingly, a detailed theoretical and empirical consideration of all occurring interferences and their effect on the efficiency of the entire power plant and the deformation of the individual collector modules and assembled module units induced thereby will be indispensable in the future for configuration and dimensioning. Efficiencies which are optimized over the long term through minimal deformation of the components utilized in the modules and of the modules themselves can be achieved specifically through this optimizing step. This was the basis for the concept and development of the device according to the invention which is described in the following. The basic possibility of influencing the flow around a photovoltaic module which is mounted by fastening to a flat roof is set forth in patent DE 10 2006 050 456, wherein it is stated that flow around correspondingly mounted photovoltaic modules can be changed by means of passive ventilation through a gap.

In technically comparable machinery and/or installations which can be operated with consistent geometry in different operation areas at various angles of orientation—an airplane is used here as a simple example—and for the configuration of the principles and/or guidelines upon which these structural components and/or constructions are based, it will necessarily be concluded that an individual adaptation and/or configuration is carried out for each individual operating point of the machine. Referring again to the airplane, this means that the designed system configuration—by adapting correspondingly possible system parameters such as, for example, changing the angle of attack and/or the deployment of additional flap elements—must be able to take off at maximum weight, satisfy flight requirements in an energy-efficient manner and land under reduced load for at least twenty-five operating years, usually, however, for substantially longer periods of time. In very rare cases, the configuration and/or optimization of these systems in the operation area will be implemented under static view points but usually under dynamic view points.

It is noted that in this disclosure and particularly in the claims and/or paragraphs, terms such as "comprises", "comprised", "comprising" and the like can have the meaning attributed to it in U.S. Patent law; e.g., they can mean "includes", "included", "including", and the like; and that terms such as "consisting essentially of" and "consists essentially of" have the meaning ascribed to them in U.S. Patent law, e.g., they allow for elements not explicitly recited, but exclude elements that are found in the prior art or that affect a basic or novel characteristic of the invention.

It is further noted that the invention does not intend to encompass within the scope of the invention any previously disclosed product, process of making the product or method of using the product, which meets the written description and enablement requirements of the USPTO (35 U.S.C. 112, first paragraph) or the EPO (Article 83 of the EPC), such that applicant(s) reserve the right to disclaim, and hereby disclose a disclaimer of, any previously described product, method of making the product, or process of using the product.

SUMMARY OF THE INVENTION

Therefore, it is the object of the invention, depending on the prevailing, changing operating conditions and local environmental influences—particularly under strong, dynamic wind load—on the power plant systems, i.e., individual collector modules and the module units composed thereof, to ensure a maximum efficiency and, by means of constant plant operation conditions, to ensure overall a correlative maximum total efficiency for every individual operating situation and/or operating load. As it relates to the individual collector modules and the module units composed thereof, this means that minimal deformations of the above-mentioned classes in the operation area must be ensured under operating conditions that may possibly occur. Alternatively, optimization may focus on different objectives, for example, the suppression, prevention and/or deliberate counter-generation of dynamic effects.

The above-stated object is met in collector modules and collector structures of the type mentioned in the beginning in that one or more rigid and/or movable devices can be mounted directly by means of one or more flanging points fixedly and/or loosely to the construction, i.e., the absorbing and/or reflecting solar modules and/or the solar collector itself, or indirectly or directly to the construction by means of possible auxiliary devices and can be moved in a suitable manner with operation of the construction statically and/or uniformly or non-uniformly. Depending on requirements for optimized operation, the devices according to the invention, by means of active forces or reactive forces, e.g., by modifying the flow around the solar modules (5) or around the entire collector (6), generate the minimum possible structure loads and/or torque loads for the individual solar modules and assembled module groups which are triggers for the deformations of the above-mentioned classes in the operation area and can accordingly result in substantially minimized efficiency.

Further, in corresponding embodiment forms by means of stabilizing measures, the devices can serve, for example, to reduce or possibly completely suppress static and/or dynamic loads or influences. By employing one or more additional devices for receiving or securing solid, liquid or gaseous materials (5), additionally needed structure loads and moments can be introduced for optimizing the entire system for operation as well as for the safety position.

The device can be constructed in accordance with the anticipated load as active or passive manipulator in a simple geometry and/or in a geometry adapted to the case of application and, in relation to the case of application, i.e., individual collector modules and/or the module units composed thereof, can be moved therewith uniformly in fixedly mounted mode of construction or in uniform or non-uniform correlation to the operating movement or can be displaced and/or controlled in isolation.

In regular plant operation, the rigid and/or movable device forming a unit with the individual collector modules and/or the module units composed thereof ensures the optimal efficiency of the overall construction of the concentrating, absorbing or reflecting modules in discrete configuration—but usually in array configuration by integration in the composite in an optimal manner with respect to construction mode. With increasing influence of the environmentally relevant parameters depending on the operating point, which parameters can be perceived in terms of results as output-reducing, the moved-along rigid devices whose positive influence on efficiency must be ensured in the preceding optimizing process and the moving devices can be utilized by means of suitable methods in the manner optimally adapted to the varying environmental parameters to reproduce the optimal efficiency of individual collector modules and/or the module units composed thereof.

This means that, for example, for the case of application where at high incident wind velocity; e.g., in a parabolic trough collector field which comprises rows of assembled individual collectors, each of which is moved by one or more movement units, a twisting occurs as a result of the summing of the respective induced individual torques of the modules taking into account the material-specific parameter. Individually for each module and for the assembled module group. Corresponding twisting values will be minimal for the modules which are located in direct mechanical connection to a fixed beating or drive and/or a movement unit. This results from the twisting of the individual, i.e., first, module at the fixed bearing itself. As the number of modules increases and with the increase in torque which is additionally induced as a result, the twisting angle in identical collector modules (and possibly additionally integrated add-on parts) is disproportionately greater. Depending on occurring static wind load, absolute twisting values for the assembled module units are achieved which sharply reduce the individual collector efficiency or even leave it at zero. Rigid and/or moving devices of the type mentioned above were actively moved along for this case or, as passive manipulators, generate corresponding resistance forces and resistance moments (generation of forces and moments which are directed counter to the original component). As a result, twisting was successfully reduced or, depending on resources for controlling and adjusting the devices, even eliminated and, therefore, an optimized efficiency of the entire system of assembled module units was achieved.

Naturally, the above-mentioned effect resulting from the use or integration of the devices according to the invention in individual collector modules and/or the module units composed thereof can also implicitly be caused by the uniformly homogeneous and/or non-uniform, homogeneous or inhomogeneous reduction of components, i.e., of the devices according to the invention and/or components at the module units and/or assembled module groups. Accordingly, the devices according to the invention can be moved in such a way in case of excessive loading through twisting, e.g., so as to be actively or passively controlled, that they generate the least possible resistances.

Further, in particular, the moving devices, depending on occurring environmental parameters and, in this case, particularly when a fixed or variable threshold, e.g., incident wind flow vector, is exceeded, can be used as passive control element, e.g., the movement of the concentrating, absorbing or reflecting modules in discrete configuration or in array configuration into a previously determined position, usually for securing the overall construction. Compared to the systems in operation heretofore which configure their drive systems in terms of power to immutable geometries to the maximum forces occurring in determined operating states, a drive can generally be dispensed with by making use of the occurring incident wind flow vector in combination with the uniformly or non-uniformly moving devices in the operation area and the forces and torques which are therefore dynamically generated; only a brake is required for arresting an individual collector module or module groups composed thereof in a predetermined position.

For the case of application taken by way of example, this means that at a high wind velocity, e.g., in a parabolic trough array which comprises rows of individual collectors, each of which is moved by one or more movement units by means of the active movement of a manipulator, torques can be generated which reinforce the torques generated by the drive, so that corresponding module units and/or module groups composed thereof can be moved partly or entirely without additional drive into their safety position (end stop).

Based on the mode of construction, solar power plant systems, depending on geometric construction, i.e., using specific reflecting and/or absorbing modules and the fastening systems and holding systems thereof, can be impaired not only by static forces and deformations resulting therefrom as was described above, but also by unsteady forces and/or unsteady excited vibrations. These constructions are substantially excited by the interaction between the geometry and environmental influences. The unsteady separation tendency of different geometric bodies, in the simplest case a plate or, e.g., a right circular cylinder, is mentioned by way of example. Efficiency losses occur principally due to the vibration excited by dynamic forces and the resulting dynamic deformation of the modules and/or assembled groups of modules.

The devices according to the invention, in rigid or flexible manner, passively moved along or actively controlled, can sharply suppress or possibly completely prevent the occurring dynamic effects analogous to the functioning explained above for the static case. Experiments conducted for solar-thermal and photovoltaic applications show a reduction in alternating loads of over 75%.

By means of additionally (passively or actively) moved devices according to the invention, the dynamic structure loads and torque loads brought about by the flow around the construction in its entirety can be completely suppressed for the operation area and in the safety position. The devices stabilize the entire system and the tracking of the entire system and accordingly ensure that the separating flow can exert the least possible dynamic effects on the adjacent or downstream systems.

The one or more rigid and/or moving devices which are fixedly and/or loosely connected to the construction and/or can be positioned in the vicinity of the construction can be suspended in a variable manner with respect to the geometry and height thereof. The height of the suspension can be adapted or changed in a variable manner suited to the load/operation and/or operation area by additional devices.

A specific construction or specific installation operation of the individual collector modules and/or of the module units composed thereof for achieving the optimal efficiency of the overall construction of the concentrating, absorbing or reflecting modules in discrete configuration—but usually in array configuration by means of integration in the composite in an optimal manner according to the mode of construction—is provided by the symmetrical or asymmetrical construction of the individual collector modules and/or the module units composed thereof in which the rigid and/or moving device and/or, further, components of the individual collector modules and/or module units composed thereof can be partially or entirely removed permanently or by active and/or passive control.

It is clear from the foregoing functional description of the use of the device with associated exemplary embodiment examples that a virtually complete protection of the solar modules in the power plant installations can be achieved by the device and additional auxiliary devices. Aside from increased system security, this also, above all, affords the possibility of a simpler system construction and of highly optimized plant operation.

In order to make full use of these advantages, it is necessary to appraise the possible optimization potential already during the conceptual planning phase of the solar power plant and to incorporate this directly into the design and subsequent construction. Studies for appraising the effect of using the device according to the invention in the subsequent individual modules and/or assembled groups of modules can be carried out already in the planning phase for the solar power plant in model scale. Accordingly, as in the development of aircraft, qualitative and quantitative design and configuration basics can be worked out. Aside from insights into the phenomenological effect of the device, corresponding results will give an indication above all about the possible quantitative optimization potential of the individual modules and assembled groups of modules compared to plants which are not optimized.

With respect to the technical embodiment, the device can be directly and/or with the assistance of possible auxiliary devices directly or indirectly fixedly and/or flexibly connected to the construction. In this regard, the device or possibly also a plurality of devices can also be mounted in combination with additional auxiliary devices in any orientation direction and in different axes. These axes can, but need not necessarily, coincide with the movement axis or movement axes of the solar modules or of the module groups composed thereof. In use, the device, whose essential function is to influence the flow around the solar module and module groups composed thereof, can be provided as rigid construction which is rigidly fastened to the solar module and moves along in an analogous manner with the movement of the solar module. During operation of the solar modules, various active forces are exerted on the solar module by the change in installation angle in one or more axes of rotation due to the change in the angle of the sun's position and corresponding tracking through the environmentally specific influence and the change thereof depending on angular position. Therefore, the use of the device according to the invention as active device is a very useful variant.

In principle, the device can be constructed symmetrically or asymmetrically with respect to the basic axes of the system. Measurements of prototypes have shown that precisely the asymmetrical construction, versus the symmetrical construction, has the essential advantages with respect to the loads and torques induced by environmentally specific influences as well as the reaction forces and reaction moments which are brought about. In extension of the asymmetrical construction, the device and/or variants of the device can be constructed and/or mounted at the solar module or an auxiliary device in a variable manner with respect to their geometry and height. By means of additional auxiliary devices, the height of the suspension can be adapted or varied relative to the load in question. Above all, this embodiment can compensate for the non-uniform incident flow, i.e., differences in the incident flow velocity depending on the incident flow height (ground boundary layer formation has considerable influence on the incident flow conditions), which can be identical to the respective height of the solar module.

For particular embodiment examples it has been shown that the assembly or integration of the devices according to the invention in the effective range of the solar collector appears at suitable flanging points and possibly by means of additional auxiliary devices. The effective range is basically defined as twice the maximum reference length of the solar collector as maximum distance therefrom. However, greater distances are also conceivable in cases of particular embodiments.

The use of lightweight structures and the modern composite materials used for this purpose for constructing the devices according to the invention guarantee maximum optimizing effect with minimal additional structure loads and torque loads through the construction itself. Further, very simple systems can also be produced from metallic materials or plastics in individual material strengths and, of course, also from combinations of the two. Aside from this, weather-resistant and UV-resistant materials also guarantee long life cycles and high availability of protection in addition to the possible mechanical stability.

As was already described, the technical embodiment of the device can be adapted individually to the anticipated load and the reaction loads and reaction moments relating thereto. Further, through creative constructional details, the device, i.e., mounting at the solar module and/or auxiliary devices of the solar module, can be used as an additional reinforcement element with the possibility of adapting the spatial position through possible deformation through the influence of the environmentally specific influence as well as active actuating components.

The airplane can once again be used as an example of a technical embodiment. By means of using miniaturized trailing edge flaps which are deployed for takeoff and landing, i.e., in the high lift phases at the trailing edges of the flaps, the torsional stiffness of the highly loaded flaps can be greatly increased while greatly increasing lift at the same time.

The device according to the invention can be protected against virtually all environmental influences in operation and, further, also in possible protection positions when using one or more additional auxiliary devices and possibly one or more additional auxiliary devices for fastening the latter which can be mounted individually or as a total structure at the solar module. In this connection, the possibility of combining a rigid, full-surface device according to the invention such as was described in the preceding paragraphs with additional auxiliary devices will be considered by way of example. These auxiliary devices can be used individually and in combination as protection (flap or wrapping) of the modules so that they are protected externally against wind, e.g., also against objects and/or media carried along by the wind, hail and even possibly against solar radiation (UV protection).

The device according to the invention can be segmented individually or in combination with additional auxiliary devices and constructed in different geometric embodiment forms. The integration of sheet elements, mesh elements, netting elements or fence elements which can also be segmented in horizontal and vertical axis and/or shaped in an inhomogeneous arrangement further allows the working surface of the devices to be individually adjusted to the anticipated load, i.e., the anticipated wind load. A plurality of elements can be combined with one another in vertical direction as well as in flow direction in order to produce an optimal effect with the least possible structural weight.

From the view point of fluidics, precisely the inhomogeneities and asymmetries in the construction of the individual solar modules and/or groups of assembled modules and devices which are indirectly or directly mounted at the latter have a positive effect on the optimization of the efficiency and the stabilization of operation.

The option of integrating the device according to the invention, as mesh element, netting element or fence element, directly in the border of a heliostat construction is used here as an embodiment example. With wind incident on the latter in the safety position, i.e., in horizontal position, this results in the case of conventional construction in dynamic excitation of the construction caused by strong, dynamic suction effects, i.e., lift and/or downforce in the flow around the construction. The mesh elements, netting elements or fence elements prevent this by impeding it partially or completely depending on the configuration of the dynamic lift effects and/or downforce effects. The mesh elements, netting elements or fence elements, as integrated component parts of the device according to the invention, can accordingly particularly contribute to the stabilization of the solar modules.

The use of devices themselves and/or of the fastening points of the devices to the horizontal and vertical edges of the modules offer additional protection and functionality. For example, the devices can be used specifically to reduce or completely block the ground clearance of the module in the different movement axes. In accordance with the geometry and construction of the device, this can also be used as mechanical stop, buffer or damper. Moreover, owing to the asymmetrical shape of the device, it can be used in combination, i.e., by using the actual actuator or by using the drive of the solar module itself, to produce and/or restore the ground clearance, e.g., by filling or deposition of granular media, and for displacing and/or transporting objects in the effective range of the module.

Aside from ensuring the protection of the absorbing and/or reflecting modules, the devices and also the auxiliary devices for receiving and/or securing or receiving and securing solid, liquid or gaseous materials can also be used for paraxial guidance of diagnostic, measuring and controlling systems as well as for cleaning the surfaces of corresponding modules. Further, the device can also be used as a guide and/or for positioning systems that are not permanently located in the effective range of the solar module.

The device according to the invention which, as was described above, can also be constructed in partial bodies or partial surfaces can be constructed in the simplest case as simple, planar plates. The latter is rigidly or swivelably, i.e., movably, fastened to the solar module directly by means of one or more fastening points or indirectly by means of an auxiliary device.

It is known from fluid mechanics that, depending on the incident flow conditions or circulating flow conditions with respect to the device according to the invention, i.e., position and/or orientation of the device, i.e., taking the example of the simply constructed planar plate, in relation to the incident flow vector, the flow around the plate only contacts both sides of the plate in a very limited area, i.e., with very slight angular deviations of the longitudinal orientation of the plate relative to the incident flow direction, and therefore bring about maximum stabilization of the circulating flow and the reactive forces associated therewith. Outside of this angular area, the flow separates when impinging on the "sharp" edge of the device according to the invention, and a zone of separated flow occurs instead of the potential accelerated flow which would normally be present on the so-called suction side. It follows that in order to further expand and optimize the efficiency of the device according to the invention, the device can be added to and/or constructed in its entirety in different geometric shapes. The right circular cylinder is mentioned as exemplary shape. A right circular cylinder would ensure a noncritical separation of the flow in a further range of variations of the possible incident flow vector of the flow and device according to the invention. However, apart from this, all conceivable standard geometries and specific profile geometries can also be used in order to ensure a stable flow around the device according to the invention in the entire operating angular range of the solar module and, in so doing, possibly to bring about maximum reaction moments, in addition, i.e., for example, through the influence of the wind. Depending on the construction and on the reactive forces to be generated at the solar module, the simple planar plate can also be constructed in a segmented manner. In addition, by using inhomogeneities, e.g., inserting holes and/or integrating fence structures or mesh structures, the ratio of flow deflection to through-flow of the respective simple planar plate can be varied and adapted to the respective requirements.

In this regard, as was already described, the device according to the invention can also have a non-uniform extension and/or shape with respect to the corresponding spatial directions of orientation. As a practical embodiment example, let it be assumed here that a rigid or flexible flap element is mounted on the so-called suction side of a parabolic trough collector, i.e., on the side of convex curvature, so that the flow, depending on the operating parameters, is deliberately stabilized and guided or so that the position of the flow separation is fixed and a stabilization and optimization of the circulating flow is accordingly ensured. In this case, as has been described, individual parts of the flap can be constructed from inhomogeneous materials. The use of different geometries and the combination thereof allows an individual stabilization of the solar module and, therefore, a maximum protection to be adjusted.

The construction of the device according to the invention can be supplemented in a simple or specific geometrical construction through additional auxiliary devices which can be outfitted in turn with additional possibility of partial through-flow, not homogeneously but rather, for example, by integration of mesh elements or fence elements. This additionally optimizes and stabilizes the flow. In addition, by using, e.g., simple protective netting as auxiliary devices, the solar module rotates into these auxiliary devices through its own rotation in the operating space and is therefore virtually completely protected from external environmental influences. However, the construction of the device according to the invention as a right circular cylinder for receiving or securing or receiving and securing solid, liquid or gaseous materials can also be mentioned here as a practical embodiment example. Thus the device according to the invention, based on the requirements in the field of solar modules, can be outfitted with additional mass and suspended at different heights at the horizontal supporting structure of a heliostat through the use of additional auxiliary devices, for example, a wind protection mesh. The flow around the heliostat is accordingly extensively modified and stabilized depending on the elevation angle of the solar module and the ground clearance adjusted in so doing. Loads and induced torques are appreciably reduced.

The use of and application of the device explained within the framework of the description of the device according to the invention and the effect thereof, i.e., the stabilization and resulting optimization of the flow around the solar modules and the protection of the latter, relate on the one hand to the solar modules themselves and on the other hand to the operation area of the individual solar modules and, finally, also to the field of application in the power plant field of solar modules. It is apparent from the consideration of individual solar power plants and entire power plant fields that individual solar modules can be stabilized and protected primarily through local modifications, e.g., through the use of the device according to the invention, and can therefore undergo optimized operation. Accordingly, particularly in the at-risk areas of corresponding power plant fields, appreciable gains in efficiency and a generally optimized operation with respect to individual solar modules can be achieved.

As concerns the individual solar module, the use of the device according to the invention is limited to the operation area of the solar module. On one hand, this means that the device according to the invention can be secured directly rigidly and/or flexibly to the solar module. However, it is also possible to secure the device according to the invention to the solar module or in the operation area of the solar module, respectively, directly or indirectly by means of one or more auxiliary devices. In this connection, the operation area of the solar module typically includes the area which would be covered by twice the respective longest basic dimension, i.e., the reference length comprising length, width or height and/or diameter or radius of the module irrespective of the one or more rotational axes, respectively, of the solar module in the different possible spatial directions.

BRIEF DESCRIPTION OF THE DRAWINGS

FIG. 2b shows the construction for typical operating position of the example of FIG. 2a.

DETAILED DESCRIPTION OF EMBODIMENTS

It is to be understood that the figures and descriptions of the present invention have been simplified to illustrate elements that are relevant for a clear understanding of the present invention, while eliminating, for purposes of clarity, many other elements which are conventional in this art. Those of ordinary skill in the art will recognize that other elements are desirable for implementing the present invention. However, because such elements are well known in the art, and because they do not facilitate a better understanding of the present invention, a discussion of such elements is not provided herein.

The present invention will now be described in detail on the basis of exemplary embodiments.

Figure 1A:
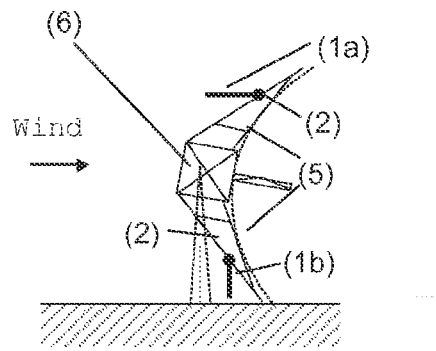
FIG. 1a shows a side elevation showing by way of example an embodiment according to the invention.
Figure 1B:
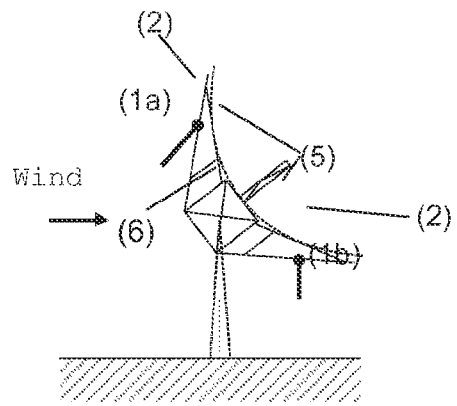
FIG. 1b shows the example of FIG. 1a in a selected operating position.

FIG. 1a is a side elevation showing by way of example the construction of a combination of the device according to the invention for optimizing individual solar collector modules and assembled groups of collector modules against environmental influences, particularly wind, with a rigid assembly which is moved along (1a) and secured to a solar-thermal collector module (6) by a fastening point (2) and movably moved along (1) in a uniform or non-uniform manner. In the protected position of the individual solar collector modules and assembled groups of collector modules, the device (1b) according to the invention acts as protection for the reflecting or absorbing modules of the collector close to the ground against particles and objects entrained in the flow. Device (1a) provides for a consistently optimized flow around the upper edge of the collector. FIG. 1b shows the construction in a selected operating position. In this case, device (1b) provides for minimizing the underflow and smaller structure loads brought about thereby and primarily torques of the collector system; the device (1a) simultaneously generates a counter-torque by means of additional flow deflection. This guarantees optimized deformations of the total system at the highest possible efficiency.

Figure 2A:
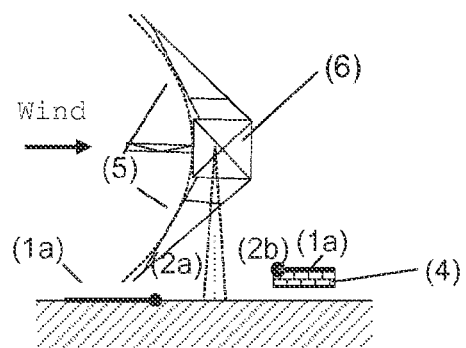
FIG. 2a shows is a side elevation showing another example of an embodiment according to the invention.
Figure 2B:
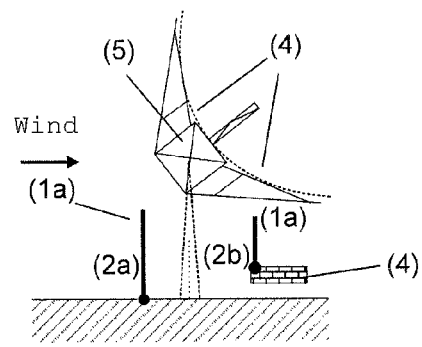

FIG. 2a is a side elevation showing the exemplary construction of a combination of the device (1) according to the invention for optimizing individual solar collector modules and assembled groups of collector modules against environmental influences, particularly wind, in an assembly which is secured in the effective range of the collector module (6) and which is movably moved along in a non-uniform manner. In the protected position of the individual solar collector modules and assembled groups of collector modules, the device (1a) acts as protection for the reflecting or absorbing modules of the collector close to the ground against particles and objects entrained in the flow. FIG. 2b shows the construction for a typical operating position. In the operation area, the device (1a) according to the invention is moved along in a non-uniform manner such that an optimized effect of protection against environmental influences, e.g., wind, and particles entrained in the flow is realized with minimal impairment, e.g., due to shading.

Figure 3:
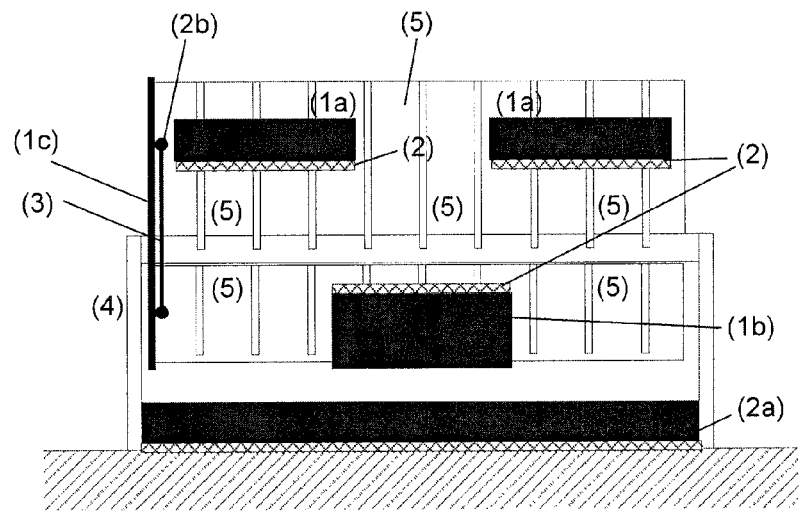
FIG. 3 is a rear elevation of the construction of another example of an embodiment according to the invention.

FIG. 3 is a rear elevation of the construction of a combination of the device according to the invention for optimizing individual solar collector modules and assembled groups of collector modules against environmental influences, particularly wind, of a combination of the devices shown in FIGS. 1a and 1b and 2a and 2b. In this case, the possible further stated features of the device according to the invention are also shown. The devices according to the invention, on the one hand in fixed assembly or actively controlled construction (1a) and freely movable assembly (1b), are secured respectively by fastening points to the base structure of the solar collector (6). Corresponding devices are constructed in a segmented manner. These devices can themselves be constructed so as to be flat or curved. In addition, the integration of mesh structures or netting structures is possible.

In addition, a device (1c) according to the invention is secured (6) to the solar collector by auxiliary device (3) in the second axis, i.e., in the present case, the axis of rotation of the solar collector (6).

Figure 4A:
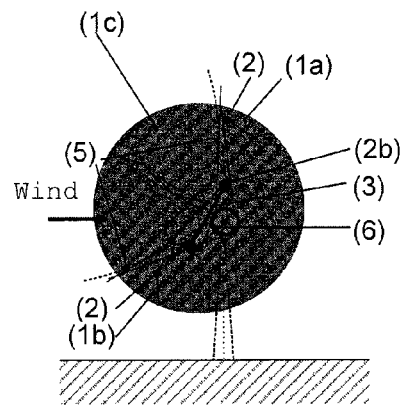
FIGS. 4a and 4b show an additional view of an embodiment according to the invention.
Figure 4B:
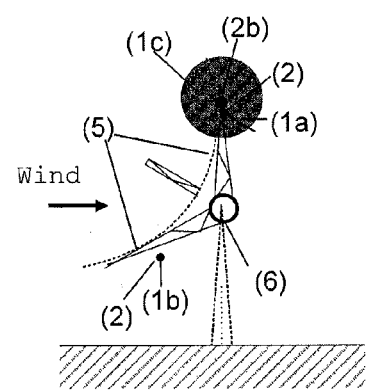

FIGS. 4a and 4b show an additional view of the combination of devices (1) according to the invention in different rotational axes and different suspension. The device (1c)

according to the invention which is constructed as a mesh structure and which is secured to the solar collector (6) by means of an auxiliary device (2*b*) prevents or optimizes the flow around the collector particularly in oblique incident flow.

Depending on the collector configuration, the device according to the invention can be mounted symmetrically with respect to the rotational axis of the solar collector (6) as is shown in FIG. 4*a* or asymmetrically as is shown in FIG. 4*b*.

Accordingly, particularly by means of changing or optimizing the flow around the edges of the absorbing or reflecting solar module (5), the unsteady loads on the modules themselves as well as, above all, the effect on the downstream modules by separation-induced eddies can be sharply reduced.

Figure 5:
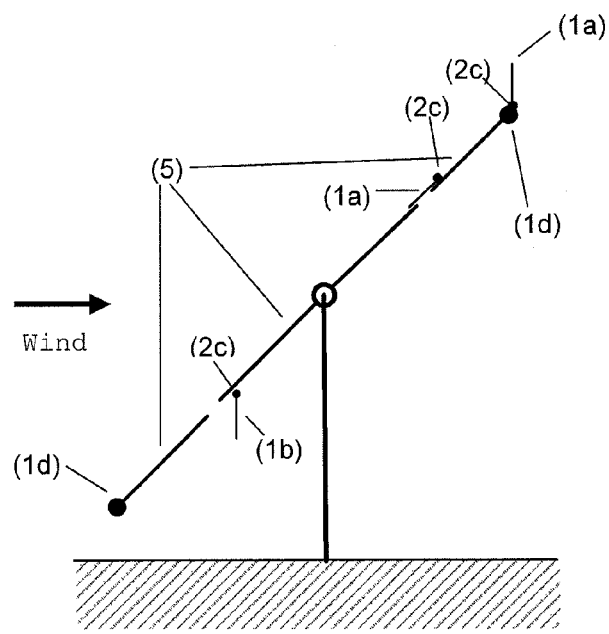
FIG. 5 shows a side elevation of an embodiment of a supporting system.

FIG. 5 shows a side elevation of a supporting system for integrating absorbing or reflecting solar modules (5) which are provided directly at these integrated devices (1) according to the invention. In this case, the flow around the lateral edges can be optimized by devices (1*d*) according to the invention, i.e., very low and/or very high pressure differences caused by the circulating flow can be sharply reduced, and the flow around the overall system, i.e., of the solar collector (6), can be optimized by passive or active ventilation through fixedly mounted and/or actively controllable (1*a*) and freely movable devices (1*b*) according to the invention. In the drawing, the pressure on the surface of the solar modules (5) of the lower collector surface in corresponding operating position is sharply attenuated by the ventilation, i.e., a gap. The devices (1*a*) according to the invention used in the upper collector surface optimize the total torque situation of the construction through an additionally generated force component by blocking the openings between the solar modules (5) but above all through a force component generated by the device (1*a*) according to the invention at the upper collector edge and/or at the upper solar module.

Figure 6:
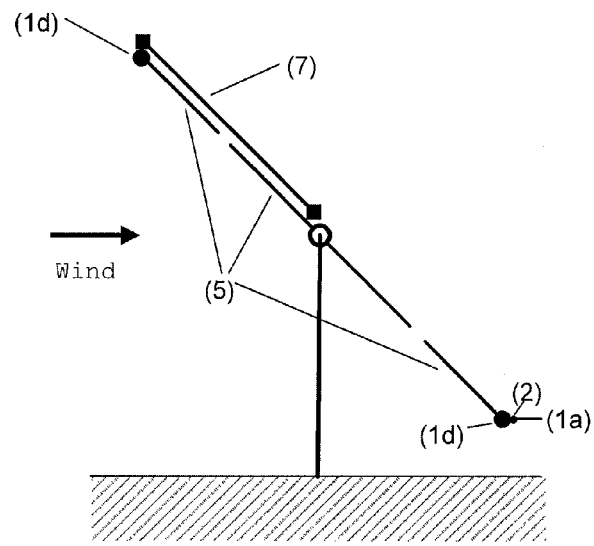
FIG. 6 shows a side elevation of an embodiment of another supporting system.

FIG. 6 shows a side elevation of a supporting system for integrating absorbing or reflecting solar modules (5) which is provided with devices (1) according to the invention. They are mounted directly on the solar modules (5). In the present embodiment, the devices (1*d*) according to the invention for optimizing the flow around the solar collector (6) can be used simultaneously as guides for auxiliary equipment (7) which is not permanently positioned in the effective range of the solar collector (6).

Figure 7:
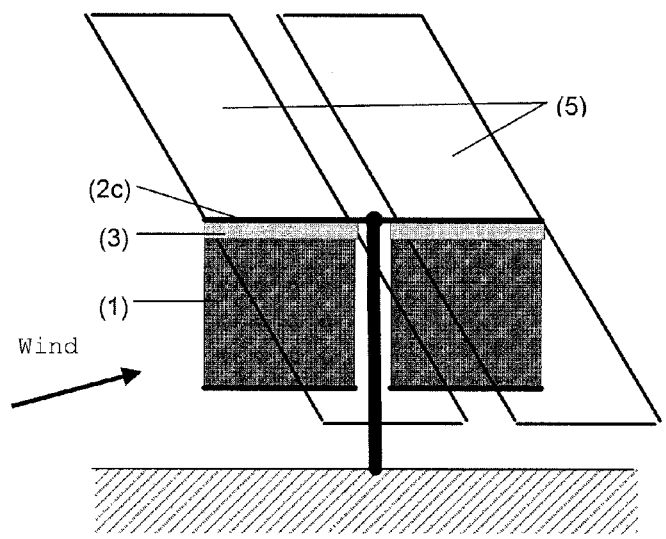
FIG. 7 shows an oblique view of an embodiment of a supporting system.

FIG. 7 shows an oblique view of a supporting system for integrating absorbing or reflecting solar modules (5) which is provided with devices (1) according to the invention. They are mounted directly on the solar modules (5) by means of auxiliary device (3) and fastening points (2*c*).

By means of the devices (1) according to the invention which are constructed in the present embodiment by netting structures and mesh structures and in combination and additionally with a device for receiving or securing or receiving and securing solid, liquid or gaseous materials, the flow overall is stabilized by the partial suppression of the underflow of the solar collector (6) while minimizing the loads and moments acting on the construction.

Figure 8:
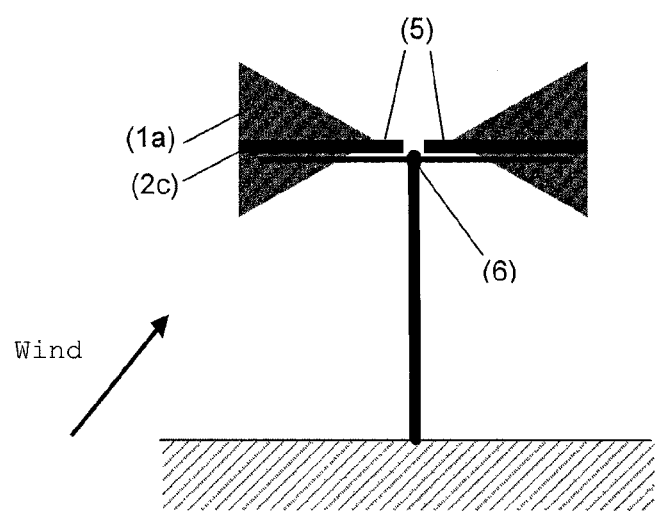
FIG. 8 is a side elevation of an embodiment of a supporting system.

FIG. 8 is a side elevation of the supporting system for integrating absorbing or reflecting solar modules (5) which is provided with devices (1) according to the invention. They are mounted directly on the solar modules (5) by means of fastening points (2*c*).

In this embodiment, the device is constructed as triangular geometry of a combination of mesh structures and plate structures. For the present case of operation, i.e., the safety position of the solar collector (6), this means that the unsteady flow components occurring at the sharp edges of the solar modules (5), i.e., eddy separation and high lift loads and downforce loads entailed thereby, are virtually completely suppressed. In addition, the fluctuations in the oncoming wind flow acting on the solar collector (6) in the incident flow due to natural turbulence or possibly by upstream constructions are partially or completely suppressed depending on the extent of blocking and/or the porosity of the device (1*a*) according to the invention.

KEY TO THE REFERENCE NUMERALS

1 device according to the invention—in its entirety
1*a* partial body of the device according to the invention, fixedly mounted and/or actively controllable
1*b* partial body of the device according to the invention, mounted so as to be freely movable
1*c* partial body of the device according to the invention, mounted in two axes, rigidly, controllably or so as to be freely movable
1*d* partial body of the device according to the invention, in rigid, controllable or movable configuration which can be used as a guide for auxiliary equipment (7)
2 flanging point and/or fastening point—its entirety
2*a* flanging point and/or fastening point mounted on ground in the effective range of the solar collector (6)
2*b* flanging point and/or fastening point mounted at mechanical support (4) and/or at auxiliary device (3) in the effective range of the solar collector (6)
2*c* flanging point and/or fastening point mounted at the absorbing or reflecting solar module (5) or at the solar collector (6)
3 auxiliary device for fastening the device (1) according to the invention
4 mechanical support(s)
5 absorbing or reflecting solar module
6 solar collector
7 auxiliary equipment which is not permanently located in the effective range of the solar collector (6)

The invention claimed is:

1. A device for optimizing individual solar collector modules and assembled groups of collector modules against diverse environmental influences, comprising:
   one or more partial bodies,
   one or more mechanical flanging points and/or fastening points which are configured to be made available directly, or by means of auxiliary devices, by one or more mechanical supports, by an absorbing or reflecting collector module itself, or a solar collector;
   wherein the device is rigidly or flexibly mounted in an operation area of the solar collector at at least one flanging point and/or fastening point;
   wherein the device is configured to move along or move in an operation area of the collector module in a uniform or non-uniform manner relative to the system's own movement, and to protect or stabilize the operation of the collector module in reaction to static or dynamic influence of a respective environmentally induced stress; and
   wherein the device is configured to generate a minimum possible structure load and/or torque load for the individual solar collector modules and the assembled module groups by generating active or reactive forces.

2. The device according to claim 1;
   wherein the device is constructed symmetrically with respect to the collector module or solar collector, and has a uniform geometry as well as a uniformly constituted extension in different spatial directions.

3. The device according to claim 1;
wherein the device is configured to be mounted and moved in one or more additional axes.

4. The device according to claim 1;
wherein the device is constructed in a segmented manner.

5. The device according to claim 1;
wherein the device is constructed in an effective range of the solar collector so as to be statically variable in one or more axes or, through the uniform or non-uniform inherent movement or collector movement, dynamically variable in one or more axes.

6. The device according to claim 1;
wherein material of the device is transparent, weather-resistant, and UV-stable.

7. The device according to claim 1;
wherein the device is configured so that generated forces and/or moments of the device act in a direction of, or a direction opposite to, a direction of a causative environmental influence.

8. The device according to claim 1;
wherein the device is rigidly mounted.

9. The device according to claim 1;
wherein the device is configured to change its geometry and/or attitude under load.

10. The device according to claim 1;
wherein the device is constructed of lightweight components and lightweight materials.

11. The device according to claim 1;
wherein the device is connected with additional auxiliary devices.

12. The device according to claim 1;
wherein the device is constructed inhomogeneously to vary the degree of blocking.

13. The device according to claim 1;
wherein the device is constructed for receiving, securing, or receiving and securing solid, liquid, or gaseous materials.

14. The device according to claim 13;
wherein the device is configured so that a fill level of the solid, liquid, or gaseous materials or a weight load of the solid materials to be secured can be adjusted individually according to an anticipated load in an operating angle area, or accordingly to corresponding reactive forces and moments to an environmental influence.

15. The device according to claim 1;
wherein the device is configured to be removed in its entirety or partially, alone or in combination with components of the collector module, by active and/or passive control.

16. The device according to claim 1;
wherein the device is configured to maintain, repair, clean, or measure the collector module through integration of additional auxiliary devices.

17. The device according to claim 1;
wherein the device is be constructed asymmetrically with respect to the solar module or solar collector, and has a non-uniform geometry as well as a non-uniformly constituted extension in different spatial directions.

18. The device according to claim 1;
wherein the device is flexibly mounted.

19. The device according to claim 1;
wherein the device guides or supports additional devices and equipment which are not permanently located in the effective range of the collector module.

* * * * *